Patented May 12, 1953

2,638,448

UNITED STATES PATENT OFFICE 2,638,448

MINERAL OIL

Joseph J. Wehrle, Clarksboro, N. J., assignor to Socony-Vacuum Oil Company, Incorporated, a corporation of New York No Drawing. Application February 14, 1950, Serial No. 144,201

10 Claims. (Cl. 252—46.7)

This invention relates, broadly, to lubricants and it is more particularly concerned with mineral oils containing an improved antioxidant.

As is well known to those familiar with the art, many materials have been proposed as addition agents to mineral oils for the purpose of improving the oxidation characteristics thereof. For example, in copending application, Serial Number 794,797, filed December 30, 1947, by John W. Brooks, now U. S. Patent Number 2,571,332, there were disclosed the reaction products of thiophenethiols and phosphorus halides. Although these reaction products are effective antioxidants, even when dispersed in oil, they are disadvantageous from the standpoint of solubility in mineral oil. Such reaction products are insoluble in some mineral oils at concentrations as low as about 0.1 weight per cent. It will be apparent to those skilled in the art that the additive will be dispersed in the oil. The dispersion which results is undesirable for lubricating internal combustion engines and the like, for obvious reasons.

It has now been discovered that the aforementioned reaction products can be rendered more soluble in mineral oils, easily and cheaply. It has now been found that when the thiophenethiol reactant is replaced in part by an alkanethiol or an aliphatic alcohol and when the reaction products are produced in a specific manner, the resulting reaction products are effective antioxidants having tremendously improved solubility in mineral oils.

Accordingly, it is a broad object of the present invention to provide an oil-soluble antioxidant for mineral oils. Another object is to provide a thiophenethiol-phosphorus halide reaction product having greatly increased oil-solubility. An important object is to provide an oil-soluble reaction product of a phosphorus halide, and an aliphatic alcohol or an alkanethiol, and a thiophenethiol. A specific object is to provide a mineral oil containing this reaction product. Other objects and advantages of the present invention will become apparent to those skilled in the art from the following detailed description.

Broadly stated, the present invention provides a mineral oil containing an amount sufficient to improve the oxidation characteristics thereof, of a reaction product obtained by reacting a monohydric reactant selected from the group consisting of alkanethiols having between about 6 and about 24 carbon atoms per molecule and aliphatic alcohols having between about 6 and about 24 carbon atoms per molecule, and a phosphorus halide, in a molar proportion varying between about 0.5:1, respectively, and about 2.5:1, respectively, to produce an intermediate product, and reacting a thiophenethiol with the intermediate product, in a molar proportion of thiophenethiol to the phosphorus halide used to produce the intermediate product varying between about 2.5:1, respectively, and about 0.5:1, respectively; the sum of the number of moles of the monohydric reactant and of the thiophenethiol so reacted with each mole of phosphorus halide being three moles.

The reactant reacted with the phosphorus halide reactant to prepare the intermediate products of this invention is an aliphatic alcohol or an alkanethiol. Any aliphatic, monohydric alcohol is utilizable herein, provided it has between about 6 and about 24 carbon atoms per molecule. The alcohol molecule can be branched-chain or straight-chain, saturated or unsaturated. Likewise, the alcohol can be a primary, secondary, or tertiary alcohol. The primary alcohol, however, is preferred. Non-limiting examples of the alcohol reactant are n-hexanol; n-heptanol-1; methylhexanol-1; 2-ethylhexanol-1; octanol-2; 2-methylheptanol-2; 2-methyl octanol-2; 2,6-dimethyl-3-methylolheptane; decanol-1; dodecanol-1; nerol; geraniol; 7-ethyl-2-methylundecanol-1; tetradecanol-1; hexadecanol-1; octadecanol-1; oleyl alcohol; linoleyl alcohol; linolenyl alcohol; phytol; eicosanol-1; erucyl alcohol; and tetracosanol-1.

The alkanethiol reactant should also have between about 6 and about 24 carbon atoms per molecule. As in the case of the alcohol reactant, the alkanethiol reactant can be straight-chain or branched-chain. It is preferred that it be a primary thiol, although a secondary or a tertiary thiol can be used. Non-limiting examples of the alkanethiol reactant are hexanethiol-1; octanethiol-1; decanethiol-1; dodecanethiol-1; tetradecanethiol-1; hexadecanethiol-1; octadecanethiol-1; tertiary dodecanethiol; tertiary tetradecanethiol; tertiary hexadecanethiol; eicosanethiol-2; and tetraeicosanethiol-1.

The phosphorus halide reactants contemplated herein include the phosphorus di- and tri-halides and derivatives thereof wherein two of the halogen atoms have been replaced by a non-metallic element of group VI A of the periodic chart of the elements, e. g., phosphorus oxyhalides and phosphorus thiohalides. The halogen atoms in these compounds can be bromine, chlorine, fluorine, or iodine. A combination of several halogens can appear in the same molecule. However, from the standpoint of commercial economics, it is preferred to use the phosphorus chlorides and bromides. Non-limiting examples of the phosphorus halide reactant are phosphorus pentabromide, phosphorus tribromide, phosphorus monobromodichloride, phosphorus monobromotetrachloride, phosphorus dibromotrichloride, phosphorus dibromotrifluoride, phosphorus trichloride, phosphorus pentachloride, phosphorus dichlorotrifluoride, phosphorus trifluoride, phosphorus pentafluoride, phosphorus triodide, phosphorus iodochloride, phosphorus oxybromide, phosphorus oxybromodichloride, phosphorus oxyfluoride, phosphorus oxychloride, phosphorus oxyiodide, phosphorus thiobromide, phosphorus thiobromodichloride, phosphorus thiochloride, phosphorus thiofluoride, and phosphorus thioiodide.

In order to produce the intermediate product, the alcohol or the alkanethiol reactant is reacted with the phosphorus halide reactant in a molar proportion of between about 0.5:1, respectively, and about 2.5:1, respectively.

The reaction between the alcohol or alkanethiol reactant and the phosphorus halide reactant is an exothermic one. Accordingly, it is usually necessary to cool the reaction mixture during the initial stages of the reaction. It is preferable to maintain the reactants at a temperature of between about 0° C. and about 15° C. during this initial reaction period. Then, the reaction mixture can be heated to temperatures as high as about 150° C., in order to complete the reaction. Often it is necessary to heat the reactants only to room temperature to achieve completion.

The time of the reaction is a non-critical factor. The completion of the reaction is usually indicated by a decrease in the formation of hydrogen halide. Ordinarily, the reaction is complete in between about 3 hours and about 10 hours.

The use of a solvent in the reaction is not essential. However, it is often feasible to use a non-polar hydrocarbon solvent. Preferred solvents are the aromatic hydrocarbon solvents of the benzene series, such as, for non-limiting examples, benzene, toluene, and xylene.

The hydrogen halide which is produced in the reaction can be removed by driving it out with heat. However, it is preferable to use a hydrogen halide acceptor for the purpose of removing the hydrogen halide. Such acceptors, well known in the art, are usually tertiary amines, such as, by way of non-limiting examples, pyridine, tributylamine, amyldiethylamine, triamylamine, and the like. The amine hydrohalide salts, thus produced, are insoluble in the reaction mixture. They can be removed therefrom by conventional methods, such as by filtration or by decantation.

It must be strictly understood that the aliphatic alcohol or the alkanethiol reactant must be reacted with the phosphorus halide reactant first, in order to produce final reaction products which are utilizable herein. The intermediate product thus produced can be isolated from the reaction mixture, if desired, as by removing the amine hydrohalide salts and by topping off unreacted materials. It has been found, however, that this is not essential. Satisfactory products are produced by reacting the intermediate product, as is, with the thiophenethiol reactant.

The thiophenethiol reactant utilizable herein can be 2-thiophenethiol or 3-thiophenethiol, or mixtures thereof. These compounds have been prepared by several methods well known in the art. For example, 3-thiophenethiol can be produced by the methods described in copending application, Serial Number 721,454, filed January 10, 1947, now U. S. Patent Number 2,515,242; and in the article in Chem. Ind., 60, 593–5, 620 (1947). The preparation of 2-thiophenethiol has been described in Ber., 19, 1615 (1886) and in Ber., 20, 1756 (1887).

The thiophenethiol reactant is reacted with the intermediate product in a molar proportion of thiophenethiol to the phosphorus halide used to produce the intermediate product of between about 2.5:1, respectively, and about 0.5:1, respectively. In other words, the aliphatic alcohol or alkanethiol reactant and the phosphorus halide reactant and the thiophenethiol reactant are reacted, in accordance with this invention, in a molar proportion of between about 0.5:1:2.5, respectively, and about 2.5:1:0.5, respectively. There is always a total of three moles of alcohol or alkanethiol reactant and thiophenethiol reactant reacted with each mole of phosphorus halide reactant. However, the reactants need not be reacted only in unitary proportions, i. e., molecular proportions need not be 1:1:2 or 2:1:1. There can be reacted fractional molecular quantities of reactants, e. g., 0.5:1:2.5, 1.5:1:1.5, 2.51:1:0.49, etc. Accordingly, it will be obvious that the final reaction products of this invention are not pure compounds, but that they are complex mixtures of compounds. Therefore, it will be appreciated that any designation assigned to these reaction products other than a recitation of the process for their preparation is not accurately descriptive of them.

The reaction between the intermediate product and the thiophenethiol reactant is also an exothermic reaction. Accordingly, the same conditions of time and temperature as are used to produce the intermediate product are used in the reaction between the intermediate product and the thiophenethiol reactant. Likewise, similar manipulative steps are involved. A solvent and/or a hydrogen halide acceptor can be used. Since these reaction conditions and manipulations have been described hereinbefore, in conjunction with the discussion of the methods of preparing the intermediate product, they will not be described again at this point. Reference can be made to the aforementioned description for the details of the methods for producing the final reaction product.

The final reaction product, after being separated from the amine hydrohalide salt, can be further purified by distilling the reaction mixture to remove by-products and unreacted reactants. It is preferable to conduct such distillation under reduced pressure.

If desired, the reaction product can be water-washed to remove water-soluble materials. Thereafter, it should be dried by any of the well known techniques, such as, for example by use of a drying agent, like calcium chloride.

In addition to the reaction products described in the specific illustrative examples, the reaction products produced from the following combinations of reactants are nonlimiting examples of the reaction products contemplated herein. In the interests of brevity and clarity, the reaction products are defined by naming the reactants and the number of moles of each reacted. Thus, dodecanol-1 (2.0) + phosphorus trichloride (1.0) + 2-thiophenethiol (1.0) would signify the reaction product produced by reacting two moles of dodecanol-1 with one mole of phosphorus trichloride to produce an intermediate product, and further reacting this intermediate product with one mole of 2-thiophenethiol, in accordance with the present invention. Other combinations are hexanol-1 (2.5) + phosphorus pentabromide (1.0) + 2-thiophenethiol (0.5); n-hepanol-1 (1) + phosphorus tribromide (1) + 3-thiophenethiol (2); 2-methyl hexanol-1 (1.75) + phosphorus monobromodichloride (1.0) + 3-thiophenethiol (1.25); 2-ethylhexanol-1 (2.25) + phosphorus monobromotetrachloride (1.0) + 2-thiophenethiol (0.75); octanol-2 (0.52) + phosphorus dibromotrichloride (1.0) + 2-thiophenethiol (2.48); 2-methylheptanol-2 (2.07) + phosphorus dibromotrifluoride (1.0) + 3-thiophenethiol (0.93); 2-methyloctanol-2 (0.8) + phosphorus trichloride (1.0) + 2-thiophenethiol (2.2); 2,6-dimethyl-3-methylolheptane (1.01) + phosphorus pentachloride (1.0) + 3-thiophenethiol (1.99); decanol-1 (0.6) + phosphorus dichlorotrifluoride (1.0) + 2-thiophenethiol (2.4); dodecanol-2 (1.95) + phosphorus trifluoride (1.0) + 3-thiophenethiol (1.05); nerol (2.2) + phosphorus pentafluoride (1.0) + 2-thiophenethiol (0.8); geraniol (1) + phosphorus triiodide (1) + 3-thiophenethiol (2); 7-ethyl-2-methylundecanol-1 (2) + phosphorus iodochloride (1) + 2-thiophenethiol (1); tetradecanol-1 (1.05) + phosphorus oxybromide (1.0) + 3-thiophenethiol (1.95); hexadecanol-1 (1.2) + phosphorus oxybromodichloride (1.0) + 2-thiophenethiol (1.8); octadecanol-1 (0.5) + phosphorus oxyfluoride (1.0) + 3-thiophenethiol (2.5); oleyl alcohol (0.75) + phosphorus oxychloride (1.0) + 2-thiophenethiol (2.25); linoleyl alcohol (2.5) + phosphorus oxyiodide (1.0) + 3-thiophenethiol (0.5); linolenyl alcohol (0.5) + phosphorus thiobromide (1.0) + 2-thiophenethiol (2.5); phytol (0.8) + phosphorus thiochloride (1.0) + 3-thiophene thiol (2.2); eicosanol-1 (1) + phosphorus thiofluoride (1) + 2-thiophenethiol (2); erucyl alcohol (0.6) + phosphorus thioiodide (1) + 3-thiophenethiol (2.4); tetracosanol-1 (0.9) + phosphorus tribromide (1.0) + 2-thiophenethiol (2.1); hexanethiol-1 (1.5) + phosphorus oxychloride (1.0) + 3-thiophenethiol (1.5); decanethiol-1 (125) + phosphorus thiobromide (1.0) + 2-thiophenethiol (1.75); dodecanethiol-1 (1) + phosphorus monobromodichloride (1) + 3-thiophenethiol (2); octanethiol-1 (1.8) + phosphorus pentachloride (1.0) + 2-thiophenethiol (1.2); octadecanethiol-1 (0.5) + phosphorus triiodide (1.0) + 2-thiophenethiol (2.5).

The following specific examples are for the purpose of illustrating the methods of preparing the reaction products of this invention, and of demonstrating the advantages thereof. It must be strictly understood that this invention is not to be limited to the particular reactants and molar proportions employed, or to the operations and manipulations described therein. A wide variety of other reactants and molar proportions, as set forth hereinbefore, can be used, as those skilled in the art will readily understand.

EXAMPLE 1

*Hexadecanol-1 (1) + phosphorus trichloride (1) + 3-thiophenethiol (2)*

A mixture of 137 grams (1 mole) of phosphorus trichloride and 25 cubic centimeters of benzene was placed in a reaction vessel. To this mixture was added, dropwise, a solution of 242 grams (1 mole) of hexadecanol-1 in 450 cubic centimeters of benzene, over a period of 1.75 hours. During this time, the temperature of the reaction mixture was maintained at 2-5° C. Then, 237 grams (3 moles) of pyridine were added slowly, meanwhile maintaining the reaction temperature below 5° C. Finally, 232 grams (2 moles) of 3-thiophenethiol were added, over a period of 3.5 hours, at a temperature of 2-4° C. After addition was complete, the reaction mixture was stirred for an additional two hours, at room temperature (about 25-30° C.). The reaction product was filtered. The filtrate was divided into two portions. One portion was water-washed. Then, both portions were topped at 150° C., under a pressure of 2 millimeters. The total yield of reaction product was 71 per cent. The two portions of the reaction product had the following analyses:

|  | Washed Product | Unwashed Product |
| --- | --- | --- |
| Percent Phosphorus | 5.60 | 5.94 |
| Percent Sulfur | 18.1 | 18.0 |
| Percent Chlorine | 0.73 | 0.74 |

Solubility in mineral oil = 10 weight percent.

EXAMPLE 2

*Octadecanethiol-1 (1) + phosphorus trichloride (1) + 3-thiophenethiol (2)*

To 207 grams (1.5 moles) of phosphorus trichloride, was added a solution of 286 grams (1 mole) of octadecanethiol-1 in 200 grams of benzene, over a period of about one hour, at a temperature of 2-4° C. When addition was complete, the coolant was removed and the reaction mixture was stirred for 4 hours, at ambient temperature. The benzene and the excess phosphorus trichloride were removed by distillation at 130° C., under 30 millimeters pressure. To the thus-topped reaction mixture were added 250 cubic centimeters of benzene and 174 grams (2.2 moles) of pyridine. Then a solution of 232 grams (2 moles) of 3-thiophenethiol in 250 cubic centimeters of benzene was added during a 3-hour period, with cooling, at 2-5° C. After addition of the reactants was complete, the reaction mixture was stirred for another 4 hours, at room temperature (about 25-30° C.), and the reaction product was filtered. The filtrate was topped at 140° C. under one millimeter pressure. The clear product decanted from the bottoms (79 per cent yield) contained 5.04 per cent phosphorus and 25.19 per cent sulfur. It was soluble in mineral oil to an extent of 10 weight per cent.

EXAMPLE 3

*Dodecanol-1 (1.5) + phosphorus oxychloride (1) + 3-thiophenethiol (1.5)*

To 153 grams (1 mole) of phosphorus oxychloride, 261 grams (3.3 moles) of pyridine, and 500 cubic centimeters of benzene, stirred at 2° C., were added 303 grams (1.5 moles) of dodecanol-1, during a 3-hour period. After being permitted to stand overnight at ambient temperatures, the reaction mixture was again cooled at 2° C. Thereupon, 174 grams (1.5 moles) of 3-thiophenethiol were added, during the course of two hours. Then, the mixture was stirred at ambient temperatures for another 5 hours and filtered. The filtrate was topped at 170° C., under 0.3 millimeter pressure, leaving 210 grams (40 per cent yield) of reaction product. This reaction product contained 11.02 per cent phosphorus and 10.91 per cent sulfur. It has a three weight per cent solubility in mineral oil.

EXAMPLE 4

*Dodecanethiol-1 (1) + phosphorus oxychloride (1) + 3-thiophenethiol (2)*

To a mixture of 153 grams (1 mole) of phosphorus oxychloride, 261 grams (3.3 moles) of pyridine, and 500 grams of benzene was added, dropwise, 218 grams (1 mole) of dodecanethiol-1, at a reaction temperature of 2° C. The reaction mixture stood overnight. Then, it was cooled to 2° C., while 232 grams (2 moles) of 3-thiophenethiol were added during a 3-hour period. The reaction mixture was stirred, finally, at ambient temperatures for 4 hours additional and then filtered. The filtrate was topped at 150° C., and under 0.5 millimeter pressure. The residue was filtered yielding 405 grams (82 per cent yield) of a reaction product containing 4.59 per cent phosphorus and 33.09 per cent sulfur. It was soluble in mineral oil to the extent of three per cent, by weight.

EXAMPLE 5

*Dodecanethiol-1 (1) + phosphorus thiochloride (1) + 3-thiophenethiol (2) (Method A)*

To a mixture of 260 grams (1.5 moles) of phosphorus thiochloride and 100 grams (1.3 moles) of pyridine, were added 218 grams (1 mole) of dodecanethiol-1, over a period of one hour, at 2° C. Stirring was continued for 4 hours. At that time 250 cubic centimeters of benzene were added, because the reaction mixture had become very thick and viscous. After standing overnight, the mixture was filtered. The filterate was topped at 150° C., under 0.5 millimeter pressure. The bottoms from the distillation operation were diluted with 500 cubic centimeters of benzene and 160 grams (2 moles) of pyridine. Then, 232 grams (2 moles) of 3-thiophenethiol were added, dropwise, during 2 hours, at 2° C. The mixture was then heated to 65° C., and stirred for 3 hours, with no additional heat being added. The resulting reaction mixture was filtered. The filtrate was topped at 120° C., under 0.3 millimeter pressure, yielding 258 grams (50 per cent yield) of product, which was decanted from a small quantity of a viscous material remaining in the bottom of the distillation flask. This product contained 3.97 per cent phosphorus and 28.17 per cent of sulfur, and it was soluble in mineral oil to an extent of 20 weight per cent.

EXAMPLE 6

*Dodecanethiol-1 (1) + phosphorus thiochloride (1) + 3-thiophenethiol (2) (Method B)*

To 170 grams (1 mole) of phosphorus thiochloride, 500 grams of benzene, and 240 grams (3 moles) of pyridine, at 2° C., were added 218 grams (1 mole) of dodecanethiol-1. After being permitted to stand overnight, the mixture was cooled again to 2° C. Then, 232 grams (2 moles) of 3-thiophenethiol were added, over a period of 5 hours. The reaction mixture was filtered. The filtrate was topped at 150° C. under 0.7 millimeter pressure, yielding 433 grams (85 per cent) of a reaction product containing 5.80 per cent phosphorus and 33.49 per cent sulfur. This reaction product was soluble in mineral oil to the extent of 5 weight per cent.

In order to determine the effect of these reaction products as antioxidants, they were subjected to a modified German tar test. In this test, a 150 gram sample of a mineral oil containing the antioxidant under test is maintained at 120° C. for 70 hours. Oxygen gas is bubbled through the test oil at the rate of two bubbles per second through a 6 mm. (I. D.) inlet tube, for the duration of the test. The amount of acidic oxidation products formed in this test is determined by titrating the oil with alcoholic potassium hydroxide. This acidity is expressed in terms of neutralization number (N. N. = number of mg. KOH equivalent to one gram of the oil blend). The results of testing oil blends of the aforedescribed reaction products are set forth in Table 1.

The test oil used was a highly-refined oil, suitable for use in transformers, which was prepared by treating coastal distillate stock with 40 pounds of 98 per cent sulfuric acid and 180 pounds of 103 per cent oleum per barrel, and then percolating the acid-treated oil through clay. This oil had a specific gravity of 0.871, a flash point of 310° F., and a Saybolt Universal viscosity of 69 seconds at 100° F. Such an oil forms acidic products upon oxidation, as is indicated by a high N. N.

TABLE 1

| Product of Example | Conc. in Oil, Percent | Test Results, N. N. |
| --- | --- | --- |
| None | | 18.0 |
| 1 | 0.1 | 0.05 |
| 2 | 0.1 | 0.02 |
| 3 | 0.1 | 1.2 |
| 4 | 0.1 | 0.1 |
| 5 | 0.1 | 0.02 |
| 6 | 0.1 | 0.14 |

Motor oils, particularly those refined by certain solvent extraction methods, tend to oxidize when subjected to high temperatures. The products thus formed are corrosive to metal-alloy bearings, such as cadmium-silver bearings, and may cause bearing failure within a relatively short period of time.

Oil blends of the reaction products of the specific illustrative examples were tested in the following test, to determine the characteristics thereof with respect to bearing corrosion: A carefully weighed, 6 gram section of a cadmium-silver alloy surfaced bearing is placed in a sample of the test oil. The oil is maintained at 175° C., for 22 hours, while air is bubbled against the surface of the bearing at the rate of two liters per hour. Then, the bearing is carefully reweighed. The loss in weight of the bearing affords a measure of the corrosiveness of the oil under test. The oil used herein was a blend of Pennsylvania neutral stock and Pennsylvania residuum stock, each of which stocks had been refined with bis-β-chloroethyl ether (Chlorex), having a specific gravity of 0.872, a flash point of 435° F., and a Saybolt Universal viscosity of 318 seconds at 100° F. This oil is an S. A. E. #20 grade motor oil. Test results of blends of additives in this oil are recorded in Table 2.

TABLE 2

| Product of Example | Conc. in Oil, Percent | Bearing Loss, mg. |
| --- | --- | --- |
| None | | 20 |
| 1 | 0.1 | 1 |
| 2 | 0.25 | 2 |
| 3 | 0.1 | Nil |
| 4 | 0.25 | 3 |
| 5 | 0.1 | 3 |
| 6 | 0.1 | Nil |

In view of the foregoing, it will be apparent that the reaction products of this invention are effective in several ways. They are quite soluble in mineral oil. The oxidation stability of mineral oils is improved thereby. Also, bearing corrosion is materially reduced when these products are added to motor oils. The additives of this invention are also useful as oxidation stabilizers for rubber and the like.

The amounts of the reaction products of this invention which are effective to improve the oxidation stability of mineral oils varies dependent on the particular reaction product used and on the oil to be improved. In general, the amount of reaction product used will vary between about 0.05 per cent and about 10 per cent, by weight. Preferably, between about 0.1 and about 2 per cent is used.

Mineral oil concentrates are also contemplated in this invention, such concentrates containing substantially larger amounts of the antioxidant than set forth hereinbefore. Thus, relatively large amounts, i. e., upwards of about ten per cent by weight and up to about 49 per cent can be incorporated in an oil fraction. The oil concentrates thus obtained may thereafter be diluted with a suitable quantity of mineral oil prior to use, to produce a mineral oil composition containing the desired optimum concentration of the additive.

It is to be understood that, in addition to the additive of the present invention, other oil addition agents can be incorporated in the oil composition. Such additives include, for example, E. P. additives, oiliness agents, pour point depressants, antirust agents, detergents, etc.

Although the present invention has been described with preferred embodiments, it is to be understood that modifications and variations may be resorted to without departing from the spirit and scope thereof, as those skilled in the art will readily understand. Such variations and modifications are considered to be within the purview and scope of the appended claims.

What is claimed is:

1. A mineral lubricating oil containing an amount sufficient to improve the oxidation characteristics thereof of the reaction product obtained by reacting a monohydric reactant selected from the group consisting of alkanethiols having between about 6 and about 24 carbon atoms per molecule and aliphatic alcohols having between about 6 and about 24 carbon atoms per molecule, and a phosphorus halide, in a molar proportion varying between about 0.5:1, respectively, and about 2.5:1, respectively, at a temperature of between about 0° C. and about 150° C., and for between about 3 hours and about 10 hours, to produce an intermediate product, and reacting a thiophenethiol with said intermediate product, in a molar proportion of said thiophenethiol to said phosphorus halide used to produce said intermediate product varying between about 2.5:1, respectively, and about 0.5:1, respectively, at a temperature of between about 0° C. and about 150° C., and for between about 3 hours and about 10 hours; the sum of the number of moles of said monohydric reactant and of said thiophenethiol so reacted with each mole of said phosphorus halide being three moles.

2. A mineral lubricating oil containing between about 0.01 per cent and about 10 per cent, by weight, of the reaction product obtained by reacting a monohydric reactant selected from the group consisting of alkanethiols having between about 6 and about 24 carbon atoms per molecule and aliphatic alcohols having between about 6 and about 24 carbon atoms per molecule, and a phosphorus halide, in a molar proportion varying between about 0.5:1, respectively, and about 2.5:1, respectively, at a temperature of between about 0° C. and about 150° C., and for between about 3 hours and about 10 hours, to produce an intermediate product, and reacting a thiophenethiol with said intermediate product, in a molar proportion of said thiophenethiol to said phosphorus halide used to produce said intermediate product varying between about 2.5:1, respectively, and about 0.5:1, respectively, at a temperature of between about 0° C. and about 150° C., and for between about 3 hours and about 10 hours; the sum of the number of moles of said monohydric reactant and of said thiophenethiol so reacted with each mole of said phosphorus halide being three moles.

3. A mineral lubricating oil containing an amount sufficient to improve the oxidation characteristics thereof of the reaction product obtained by reacting a monohydric reactant selected from the group consisting of alkanethiols having between about 6 and about 24 carbon atoms per molecule and aliphatic alcohols having between about 6 and about 24 carbon atoms per molecule, and phosphorus trichloride, in a molar proportion varying between about 0.5:1, respectively, and about 2.5:1, respectively, at a temperature of between about 0° C. and about 150° C., and for between about 3 hours and about 10 hours, to produce an intermediate product, and reacting a thiophenethiol with said intermediate product, in a molar proportion of said thiophenethiol to said phosphorus trichloride used to produce said intermediate product varying between about 2.5:1, respectively, and about 0.5:1, respectively, at a temperature of between about 0° C. and about 150° C., and for between about 3 hours and about 10 hours; the sum of the number of moles of said monohydric reactant and of said thiophenethiol so reacted with each mole of said phosphorus trichloride being three moles.

4. A mineral lubricating oil containing an amount sufficient to improve the oxidation characteristics thereof of the reaction product obtained by reacting a monohydric reactant selected from the group consisting of alkanethiols having between about 6 and about 24 carbon atoms per molecule and aliphatic alcohols having between about 6 and about 24 carbon atoms per molecule, and phosphorus oxychloride, in a molar proportion varying between about 0.5:1, respectively, and about 2.5:1, respectively, at a temperature of between about 0° C. and about 150° C., and for between about 3 hours and about 10 hours, to produce an intermediate product, and reacting a thiophenethiol with said intermediate product, in a molar proportion of said thiophenethiol to said phosphorus oxychloride used to produce said intermediate product varying between about 2.5:1, respectively, and about 0.5:1, respectively, at a temperature of between about 0° C. and about 150° C., and for between about 3 hours and about 10 hours; the sum of the number of moles of said monohydric reactant and of said thiophenethiol so reacted with each mole of said phosphorus oxychloride being three moles.

5. A mineral lubricating oil containing an amount sufficient to improve the oxidation characteristics thereof of the reaction product obtained by reacting a monohydric reactant selected from the group consisting of alkanethiols having between about 6 and about 24 carbon atoms per molecule and aliphatic alcohols having between about 6 and about 24 carbon atoms per molecule, and phosphorus thiochloride, in a molar proportion varying between about 0.5:1, respectively, and about 2.5:1, respectively, at a temperature of between about 0° C. and about 150° C., and for between about 3 hours and about 10 hours, to produce an intermediate product, and reacting a thiophenethiol with said intermediate product, in a molar proportion of said thiophenethiol to said phosphorus thiochloride used to produce said intermediate product varying between about 2.5:1, respectively, and about 0.5:1, respectively, at a temperature of between about 0° C. and about 150° C., and for between about 3 hours and about 10 hours, the sum of the number of moles of said monohydric reactant and of said thiophenethiol so reacted with each mole of said phosphorus thiochloride being three moles.

6. A mineral lubricating oil containing an amount sufficient to improve the oxidation characteristics thereof of the reaction product obtained by reacting an alkanethiol having between about 6 and about 24 carbon atoms per molecule, and a phosphorus chloride, in a molar proportion varying between about 0.5:1, respectively, and about 2.5:1, respectively, at a temperature of between about 0° C. and about 150° C., and for between about 3 hours and about 10 hours, to produce an intermediate product, and reacting a thiophenethiol with said intermediate product, in a molar proportion of said thiophenethiol to said phosphorus chloride used to produce said intermediate product varying between about 2.5:1, respectively, and about 0.5:1, respectively, at a temperature of between about 0° C. and about 150° C., and for between about 3 hours and about 10 hours, the sum of the number of moles of said alkanethiol and of said thiophenethiol so reacted with each mole of said phosphorus chloride being three moles.

7. A mineral lubricating oil containing an amount sufficient to improve the oxidation characteristics thereof of the reaction product obtained by reacting an aliphatic alcohol having between about 6 and about 24 carbon atoms per molecule, and a phosphorus chloride, in a molar proportion varying between about 0.5:1, respectively, and about 2.5:1, respectively, at a temperature of between about 0° C. and about 150° C. and for between about 3 hours and about 10 hours, to produce an intermediate product, and reacting a thiophenethiol with said intermediate product, in a molar proportion of said thiophenethiol to said phosphorus chloride used to produce said intermediate product varying between about 2.5:1, respectively, and about 0.5:1, respectively, at a temperature of between about 0° C. and about 150° C., and for between about 3 hours and about 10 hours; the sum of the number of moles of said aliphatic alcohol and of said thiophenethiol so reacted with each mole of said phosphorus chloride being three moles.

8. A mineral lubricating oil containing an amount sufficient to improve the oxidation characteristics thereof of the reaction product obtained by reacting dodecanethiol and phosphorus thiochloride, in a molar proportion varying between about 0.5:1, respectively, and about 2.5:1, respectively, at a temperature of between about 0° C. and about 150° C., and for between about 3 hours and about 10 hours, to produce an intermediate product, and reacting 3-thiophenethiol with said intermediate product, in a molar proportion of said 3-thiophenethiol to said phosphorus thiochloride used to produce said intermediate product varying between about 2.5:1, respectively, and about 0.5:1, respectively, at a temperature of between about 0° C. and about 150° C., and for between about 3 hours and about 10 hours; the sum of the number of moles of said dodecanethiol and of said 3-thiophenethiol so reacted with each mole of said phosphorus thiochloride being three moles.

9. A mineral lubricating oil containing an amount sufficient to improve the oxidation characteristics thereof of the reaction product obtained by reacting dodecanol and phosphorus oxychloride, in a molar proportion varying between about 0.5:1, respectively, and about 2.5:1, respectively, at a temperature of between about 0° C. and about 150° C., and for between about 3 hours and about 10 hours, to produce an intermediate product, and reacting 3-thiophenethiol with said intermediate product, in a molar proportion of said 3-thiophenethiol to said phosphorus oxychloride used to produce said intermediate product varying between about 2.5:1, respectively, and about 0.5:1, respectively, at a temperature of between about 0° C. and about 150° C., and for between about 3 hours and about 10 hours; the sum of the number of moles of said dodecanol and of said 3-thiophenethiol so reacted with each mole of said phosphorus oxychloride being three moles.

10. A mineral lubricating oil containing an amount sufficient to improve the oxidation characteristics thereof of the reaction product obtained by reacting hexadecanol and phosphorus trichloride, in a molar proportion varying between about 0.5:1, respectively, and about 2.5:1, respectively, at a temperature of between about 0° C. and about 150° C., and for between about 3 hours and about 10 hours, to produce an intermediate product, and reacting 3-thiophenethiol with said intermediate product, in a molar proportion of said 3-thiophenethiol to said phosphorus trichloride used to produce said intermediate product varying between about 2.5:1, respectively, and about 0.5:1, respectively, at a temperature of between about 0° C. and about 150° C., and for between about 3 hours and about 10 hours; the sum of the number of moles of said hexadecanol and of said 3-thiophenethiol so reacted with each mole of said phosphorus trichloride being three moles.

JOSEPH J. WEHRLE.

References Cited in the file of this patent

UNITED STATES PATENTS

| Number | Name | Date |
|---|---|---|
| 2,495,467 | Morris et al. | Jan. 24, 1950 |
| 2,500,498 | Reiff et al. | Mar. 14, 1950 |
| 2,502,390 | Reiff et al. | Mar. 28, 1950 |